(12) United States Patent
Nagasawa et al.

(10) Patent No.: US 10,391,964 B2
(45) Date of Patent: Aug. 27, 2019

(54) VEHICLE OCCUPANT PROTECTION APPARATUS

(71) Applicant: SUBARU CORPORATION, Tokyo (JP)

(72) Inventors: Isamu Nagasawa, Tokyo (JP); Takao Kondo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/652,365

(22) Filed: Jul. 18, 2017

(65) Prior Publication Data

US 2018/0093632 A1    Apr. 5, 2018

(30) Foreign Application Priority Data

Sep. 30, 2016    (JP) .................................. 2016-194160

(51) Int. Cl.
*B60R 21/18*    (2006.01)
*B60R 21/0136*    (2006.01)
(Continued)

(52) U.S. Cl.
CPC .......... *B60R 21/18* (2013.01); *B60R 21/0132* (2013.01); *B60R 21/0136* (2013.01);
(Continued)

(58) Field of Classification Search
CPC . B60R 21/18; B60R 21/0132; B60R 21/0136; B60R 21/231; B60R 2021/0058;
(Continued)

(56) References Cited

U.S. PATENT DOCUMENTS 5,486,019 A * 1/1996 Chevroulet ........... B60R 21/164
                                                                180/271
7,152,880 B1 * 12/2006 Pang ..................... B60R 21/233
                                                                280/743.2
(Continued)

FOREIGN PATENT DOCUMENTS

CN         1824548 A      8/2006
CN       102481888 A      5/2012
(Continued)

OTHER PUBLICATIONS

JPO Notification of Reasons for Refusal in JPA No. 2016-194160 dated May 22, 2018 (and English translation) and Decision of Grant in JPA No. 2016-194160 dated Aug. 28, 2018 (and English translation).
(Continued)

*Primary Examiner* — Paul N Dickson
*Assistant Examiner* — Timothy Wilhelm
(74) *Attorney, Agent, or Firm* — McGinn IP Law Group, PLLC

(57) ABSTRACT

A vehicle occupant protection apparatus includes a seat for an occupant of a vehicle and an airbag device. The airbag device includes a front airbag configured to deploy in front of an upper body of the occupant in the seat. The front airbag is capable of deploying so as to receive the upper body that has been displaced forward from a seating position on the seat. The front airbag includes a pair of shoulder-receiving projections capable of receiving both shoulders of the upper body that has been displaced forward from the seating position by projecting rearward at both sides of the front airbag in a vehicle width direction of the vehicle in a deployed state.

18 Claims, 7 Drawing Sheets

(51) Int. Cl.
    *B60R 21/231*      (2011.01)
    *B60R 21/0132*      (2006.01)
    *B60R 21/00*      (2006.01)
    *B60R 21/013*      (2006.01)
    *B60R 21/02*      (2006.01)
    *B60R 21/16*      (2006.01)

(52) U.S. Cl.
    CPC .... *B60R 21/231* (2013.01); *B60R 2021/0058* (2013.01); *B60R 2021/01315* (2013.01); *B60R 2021/0273* (2013.01); *B60R 2021/161* (2013.01)

(58) Field of Classification Search
    CPC .. B60R 2021/01315; B60R 2021/0273; B60R 2021/161
    See application file for complete search history.

(56) References Cited

U.S. PATENT DOCUMENTS

| | | | |
|---|---|---|---|
| 8,544,882 B2 | 10/2013 | Gulde et al. | |
| 8,678,429 B2* | 3/2014 | Nagasawa | B60R 21/233 |
| | | | 280/729 |
| 9,463,763 B2* | 10/2016 | Watamori | B60R 21/23138 |
| 9,527,469 B2* | 12/2016 | Fukawatase | B60R 21/231 |
| 9,676,363 B1* | 6/2017 | Deng | B60R 21/233 |
| 10,023,144 B2* | 7/2018 | Taguchi | B60R 21/205 |
| 2009/0121462 A1* | 5/2009 | Rick | B60R 21/206 |
| | | | 280/729 |
| 2010/0213692 A1* | 8/2010 | Nagai | B60R 21/2346 |
| | | | 280/729 |
| 2013/0001934 A1* | 1/2013 | Nagasawa | B60R 21/233 |
| | | | 280/731 |
| 2013/0282255 A1 | 10/2013 | Pursifull | |
| 2014/0361521 A1* | 12/2014 | Fukawatase | B60R 21/231 |
| | | | 280/730.1 |
| 2015/0285111 A1 | 10/2015 | Rollinger et al. | |
| 2016/0186656 A1 | 6/2016 | Judet et al. | |
| 2017/0129439 A1 | 5/2017 | Taguchi et al. | |
| 2017/0268448 A1 | 9/2017 | Takahashi et al. | |

FOREIGN PATENT DOCUMENTS

| | | |
|---|---|---|
| EP | 2 698 510 A1 | 2/2014 |
| JP | S 47-024736 U1 | 11/1972 |
| JP | H 10-184336 A | 7/1998 |
| JP | 2005-067483 A | 3/2005 |
| JP | 2006-256508 A | 9/2006 |
| JP | 2013-014176 A | 1/2013 |
| JP | 2016-037137 A | 3/2016 |
| JP | 2016-049882 A | 4/2016 |
| JP | 2017-166449 A | 9/2017 |
| WO | WO2012/140734 A1 | 7/2014 |
| WO | WO2016/002384 A1 | 4/2017 |

OTHER PUBLICATIONS

Japanese Office Action dated May 22, 2018 in corresponding Japanese Application No. 2016-194160 with an English Machine translation thereof.

Chinese Office Action dated Feb. 3, 2019, in Chinese Patent Application No. 201710657186 with a partial English translation.

* cited by examiner

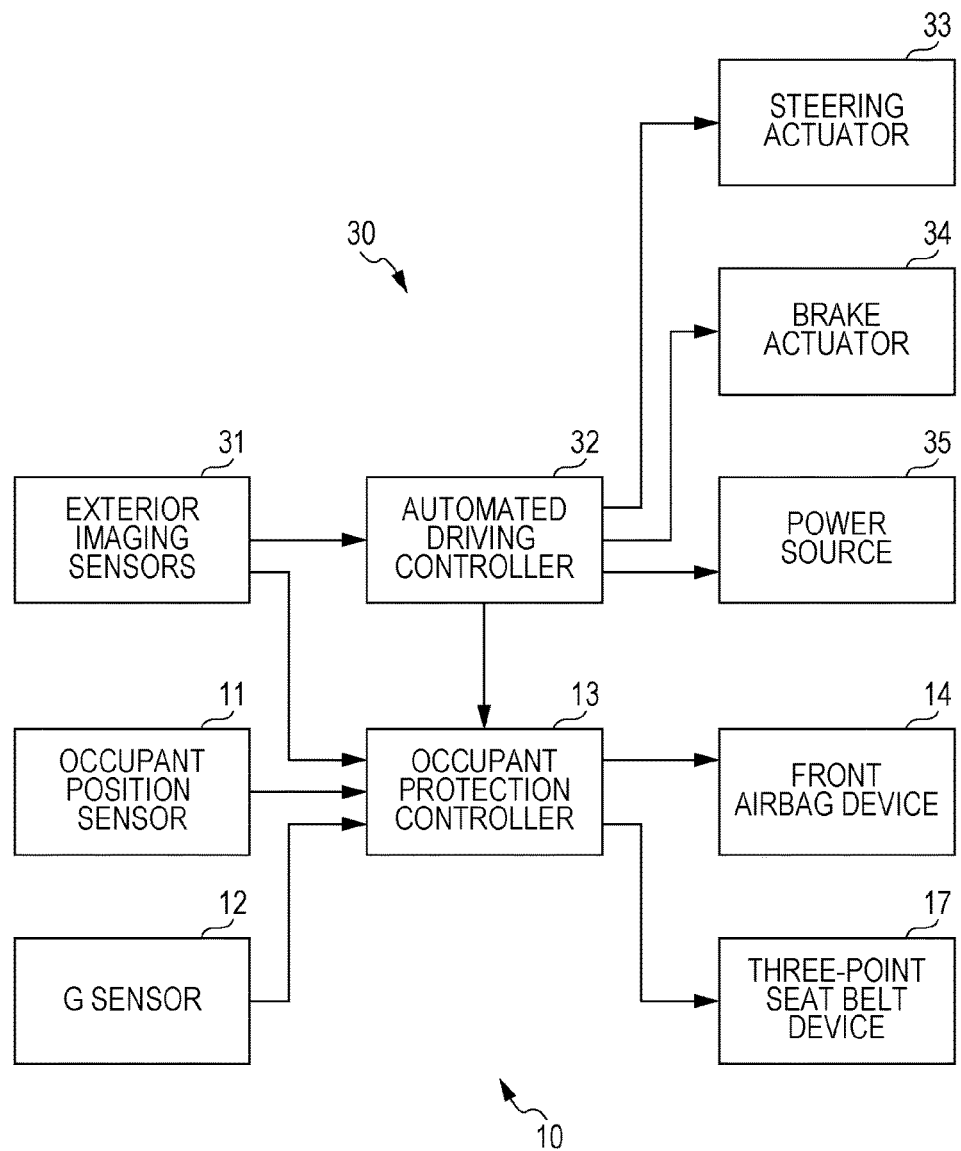

VEHICLE OCCUPANT PROTECTION APPARATUS

CROSS-REFERENCE TO RELATED APPLICATIONS

The present application claims priority from Japanese Patent Application No. 2016-194160 filed on Sep. 30, 2016, the entire contents of which are hereby incorporated by reference.

BACKGROUND

1. Technical Field

The present invention relates to an occupant protection apparatus for a vehicle, such as an automobile.

2. Related Art

In recent years, research on automated driving has been started in the field of automobiles (Japanese Unexamined Patent Application Publication No. 2005-067483).

An automated driving automobile controls the driving state thereof irrespective of the intention of an occupant, such as a driver. When, for example, the automobile automatically avoids a collision, control may be performed to drive the automobile at a performance level closer to that of the vehicle's marginal performance than it would be if the automobile was driven by a driver. For example, if there is an immediate possibility of collision, control may be performed so that the automobile steers itself almost as hard as it does at the marginal performance to avoid a collision.

If, for example, the automobile controlled at a performance level close to that of the vehicle's marginal performance is unable to avoid a collision, there is a possibility that the collision will occur under conditions different from those in the case where a driver driving an existing automobile tried to avoid a collision.

For example, when the automobile rapidly decelerates during automated driving, the upper body of an occupant in a seat may be displaced forward from a seating position on the seat even if the upper body of the occupant in the seat is restrained by a three-point seat belt at the time of collision. If a collision occurs after the upper body of the occupant has been displaced forward from the seating position on the seat, the upper body will be displaced further forward away from the seating position on the seat. Since the upper body has been displaced forward from the seating position on the seat before collision, even if a front airbag starts to deploy in response to the collision, the front airbag may not be able to appropriately receive the upper body, which moves further forward due to the impact of the collision. For example, when the front airbag is designed to deploy on the assumption that the upper body is at a normal seating position, the upper body will sink into the front airbag before the front airbag is fully deployed.

Also when, for example, the occupant is preoccupied with something other than collision and is not prepared for the collision, there is a possibility that the occupant's upper body will largely move forward beyond the expected movement range at the time of collision.

SUMMARY OF THE INVENTION

Accordingly, it is expected that a vehicle, such as an automobile, will be required to have an occupant protection function that differs from that of an existing automobile during, for example, automated driving.

An aspect of the present invention provides a vehicle occupant protection apparatus including a seat for an occupant of a vehicle and an airbag device including a front airbag configured to deploy in front of an upper body of the occupant in the seat. The front airbag is capable of deploying so as to receive the upper body that has been displaced forward from a seating position on the seat. The front airbag includes a pair of shoulder-receiving projections capable of receiving both shoulders of the upper body that has been displaced forward from the seating position by projecting rearward at both sides of the front airbag in a vehicle width direction of the vehicle in a deployed state.

One of the pair of shoulder-receiving projections at a first side in the vehicle width direction may project further toward a rear of the vehicle than the other of the pair of shoulder-receiving projections at a second side in the vehicle width direction.

The vehicle occupant protection apparatus may further include a three-point seat belt device configured to operate so as to restrain the upper body of the occupant in the seat in the seating position while holding the shoulder of the occupant at the first side in the vehicle width direction. When the front airbag deploys, the shoulder-receiving projection at the second side in the vehicle width direction may deploy so as to be harder than another portion of the front airbag including the shoulder-receiving projection at the first side in the vehicle width direction, and receive the shoulder at the second side of the upper body that has been displaced forward from the seating position.

When the front airbag deploys, the shoulder-receiving projection at the first side in the vehicle width direction may more easily buckle than the shoulder-receiving projection at the second side in the vehicle width direction upon receiving a load of the shoulder at the first side of the upper body that has been displaced forward from the seating position on the seat.

The shoulder-receiving projection at the second side in the vehicle width direction may be formed as an air chamber different from an air chamber of a remaining portion of the front airbag, so that the shoulder-receiving projection at the second side in the vehicle width direction is capable of deploying so as to be harder than the shoulder-receiving projection at the first side in the vehicle width direction.

The front airbag in a deployed state may include a contact surface that extends between the pair of shoulder-receiving projections in the vehicle width direction at a location in front of rear ends of the shoulder-receiving projections.

The shoulder-receiving projection at the second side may include an oblique surface at a side facing a center of the front airbag.

The shoulder-receiving projection at the second side may have a groove that extends in a vertical direction of the vehicle in a surface facing a center of the front airbag.

The front airbag may be capable of deploying so that the shoulder-receiving projections at both sides of the front airbag in the vehicle width direction project rearward beyond a central portion of the front airbag in the vehicle width direction.

The front airbag may be capable of deploying so that the shoulder-receiving projections at both sides of the front airbag in the vehicle width direction project rearward beyond a central projection provided at a center of the front airbag in the vehicle width direction.

The vehicle occupant protection apparatus may further include a controller configured to control an operation of the airbag device in accordance with a driving state of the vehicle. The controller may be configured to cause the front airbag to deploy so as to form the pair of shoulder-receiving projections when there is a possibility of one or both of a collision during automated driving control including driving assistance control of the vehicle and a collision during rapid deceleration, and otherwise causes the front airbag to deploy so as not to form the pair of shoulder-receiving projections and receive an entirety of the upper body that has been in the seating position.

The vehicle occupant protection apparatus may further include a detector configured to detect a position of the upper body of the occupant in the seat. The controller may be configured to determine the position of the upper body during one or both of automated driving control including driving assistance control of the vehicle and rapid deceleration on the basis of a detection result obtained by the detector. The controller may be configured to cause the front airbag to deploy so as to form the pair of shoulder-receiving projections when the upper body has been displaced forward from the seating position, and causes the front airbag to deploy so as not to form the pair of shoulder-receiving projections when the upper body is in the seating position.

BRIEF DESCRIPTION OF THE DRAWINGS

FIG. 3 illustrates a vehicle occupant protection apparatus according to a first example of the present invention;

DETAILED DESCRIPTION

Examples of the present invention will now be described with reference to the drawings.

First Example

Figure 1:
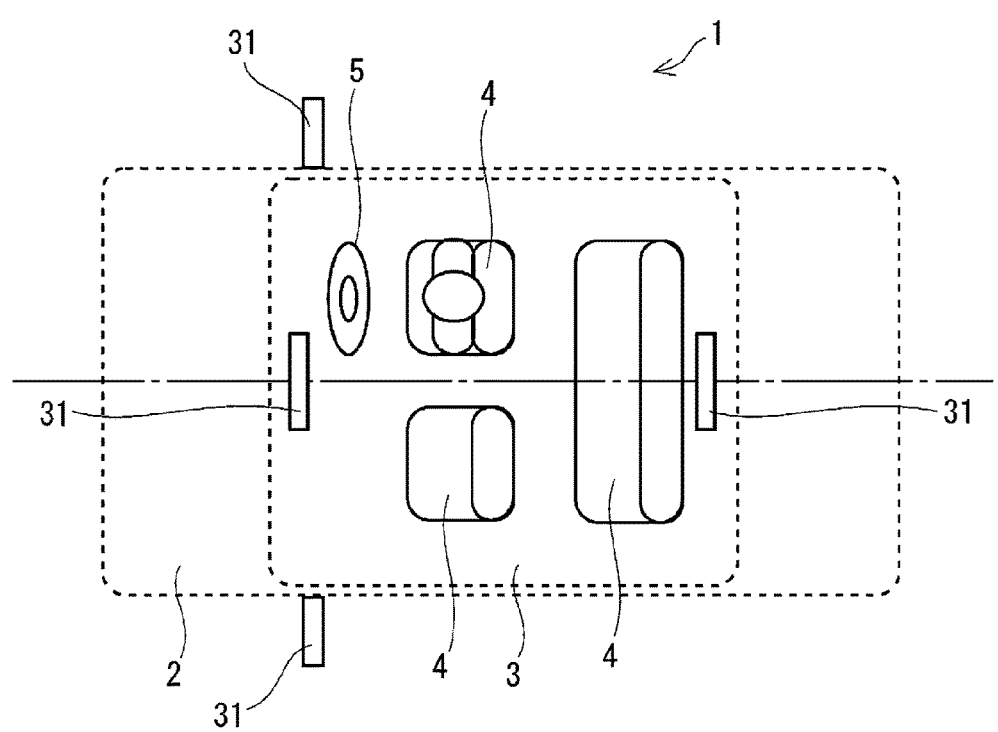
FIG. 1 illustrates an automobile to which a vehicle occupant protection apparatus according to an example of the present invention is applicable.

FIG. 1 illustrates an automobile 1 to which a vehicle occupant protection apparatus 10 according to an example of the present invention is applicable.

FIG. 1 is a top view of the automobile 1. The automobile 1 is an example of a vehicle.

The automobile 1 illustrated in FIG. 1 includes a vehicle body 2. A plurality of seats 4 for occupants are disposed in an occupant cabin 3 of the vehicle body 2. A steering wheel 5, an accelerator pedal (not illustrated), and a brake pedal (not illustrated) are disposed in front of the right front seat 4. An occupant in this seat 4 operates the steering wheel 5 and other devices to move the automobile 1 forward or backward, stop the automobile 1, or turn the automobile 1 right or left.

With regard to the automobile 1, research on automated driving has been started in recent years. Automated driving includes driving assistance that simply provides warning or interpolation for an operation by an occupant. However, it is expected that fully automated driving will be realized in the future so that when, for example, a destination is set, an automobile automatically drives itself to the set destination.

In automated driving, it is important to monitor the ambient environment of the moving automobile 1 and perform occupant protection control for avoiding a collision when the automobile 1 is approaching, for example, another automobile 1. The ambient environment of the automobile 1 may be monitored on the basis of images obtained by, for example, a front imaging sensor 31 disposed in the occupant cabin 3 so as to face forward, a rear imaging sensor 31 disposed in the occupant cabin 3 so as to face rearward, and left and right imaging sensors 31 disposed on the left and right sides of the vehicle body 2.

Figure 2A:
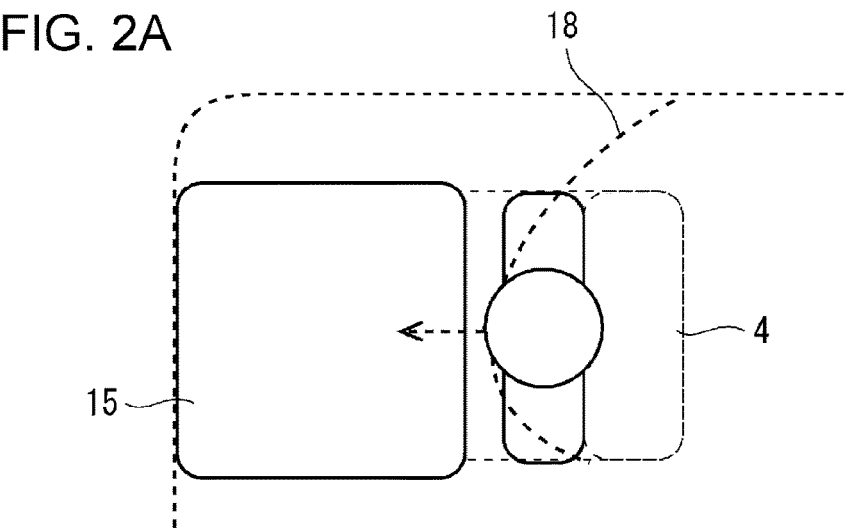
FIGS. 2A to 2C illustrate an ordinary occupant protection apparatus for the automobile illustrated in FIG. 1.
Figure 2B:
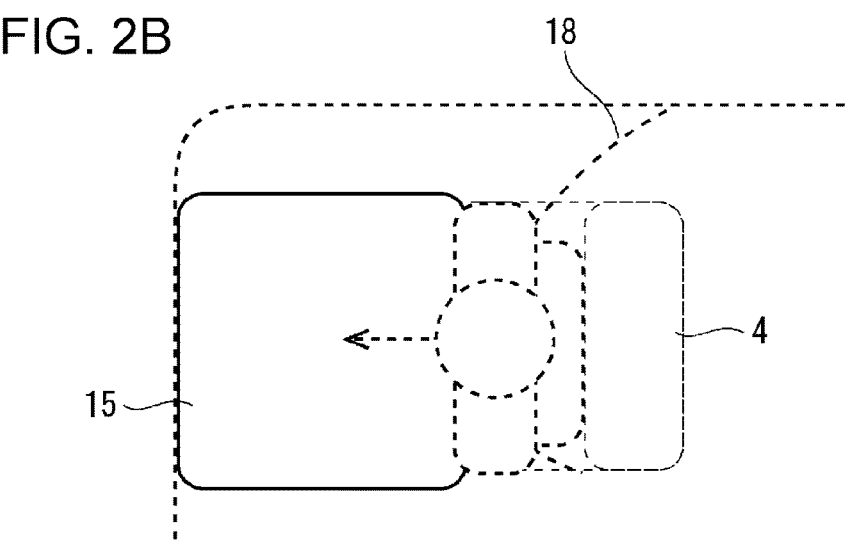
Figure 2C:
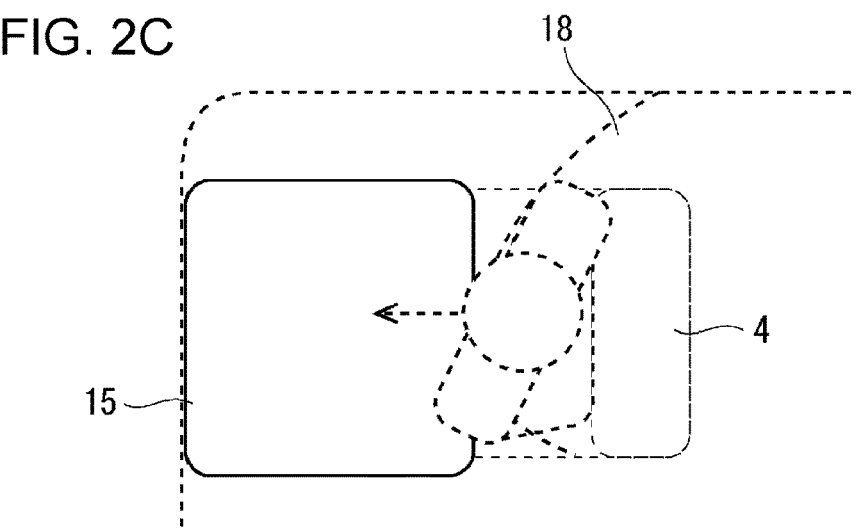

FIGS. 2A to 2C illustrate an ordinary occupant protection apparatus 10 for the automobile 1 illustrated in FIG. 1.

FIGS. 2A to 2C illustrate a front airbag 15 that deploys in front of the upper body of an occupant in the seat 4, and a three-point seat belt 18 that restrains the upper body in a seating position.

Referring to FIG. 2A, when, for example, the occupant's upper body is in the seating position, in which the back of the occupant is in contact with the seat 4, by being restrained by the seat belt 18 before collision, the front airbag 15 can deploy while the front airbag 15 is away from the upper body. Then, when the front of the automobile 1 collides with another automobile 1, the upper body moves forward from the seating position. The upper body that moves forward can be received by the front airbag 15 in the deployed state. Thus, the occupant can be appropriately protected.

During automated driving, the automobile 1 controls the driving state thereof irrespective of the intention of the occupant, such as a driver. When, for example, the automobile 1 automatically avoids a collision, control may be performed to drive the automobile 1 at a performance level closer to that of the vehicle's marginal performance than it would be if the automobile 1 was driven by a driver. For example, if there is an immediate possibility of collision, steering control may be performed so that the automobile 1 steers itself almost as hard as it does at the marginal performance to avoid a collision.

If, for example, the automobile 1 is unable to avoid a collision and collides while being controlled at a performance level close to that of the vehicle's marginal performance, the collision may occur under conditions different from those in the case where the automobile 1 collides after an ordinary driver's attempt to avoid collision.

For example, when the automobile 1 rapidly decelerates during automated driving, there is a possibility that the shoulders of the upper body of the occupant in the seat 4 will be largely displaced forward from the seating position on the seat 4, as illustrated in FIG. 2B. If the front airbag 15 deploys while the shoulders of the upper body are displaced forward beyond a normally expected range, the upper body will hit the front airbag 15 before the front airbag 15 is fully deployed. In this case, there is a possibility that the upper body cannot be appropriately received by the front airbag 15.

Even when the shoulder of the upper body at a first side is held by the three-point seat belt 18 before collision, as illustrated in FIG. 2C, there is a possibility that the shoulder at a second side (shoulder at the inner side near the center in the vehicle width direction in FIG. 2C), which is not held by the seat belt 18, will be largely displaced forward. Also in this case, there is a possibility that the shoulder of the upper body at the second side will hit the front airbag 15 before the front airbag 15 is fully deployed and the upper body cannot be appropriately received by the front airbag 15.

In the case where a collision occurs after the upper body has been displaced forward from the seating position on the seat 4, even if the front airbag 15 starts to deploy in response to the collision, the front airbag 15 may not be able to appropriately receive the upper body, which moves further forward due to the impact of the collision, because the shoulders of the upper body had been displaced forward from the seating position on the seat 4 before collision. When the front airbag 15 is designed to deploy on the assumption that the shoulders of the upper body are at a normal seating position, the upper body will sink into the front airbag 15 before the front airbag 15 is fully deployed.

Also when, for example, the occupant is preoccupied with something other than collision and is not prepared for the collision, there is a possibility that the occupant's upper body will largely move forward beyond the expected movement range at the time of collision. The moving direction is not limited to forward, and may instead be, for example, obliquely forward.

Accordingly, it is expected that a vehicle, such as the automobile 1, will be required to have an occupant protection function that differs from that of an existing automobile 1 during, for example, automated driving.

FIG. 3 illustrates the vehicle occupant protection apparatus 10 according to a first example of the present invention.

FIG. 3 also illustrates an automated driving control device 30 together with the occupant protection apparatus 10. The automated driving control device 30 includes the above-described exterior imaging sensors 31, an automated driving controller 32, a steering actuator 33, a brake actuator 34, and a power source 35.

The steering actuator 33 steers the automobile 1 in place of the steering wheel 5. The brake actuator 34 applies brakes on the automobile 1 in place of the brake pedal. The power source 35 is, for example, a gasoline engine or an electric motor. The automated driving controller 32 controls the steering actuator 33, the brake actuator 34, and the power source 35 in accordance with, for example, the path to the destination. The automated driving controller 32 also identifies an approaching object based on images obtained by the exterior imaging sensors 31. When there is a possibility of collision with the approaching object, the automated driving controller 32 controls the steering actuator 33, the brake actuator 34, and the power source 35 to avoid collision.

The occupant protection apparatus 10 illustrated in FIG. 3 includes an occupant position sensor 11, a G sensor 12, an occupant protection controller 13, a front airbag device 14, and a three-point seat belt device 17.

The occupant position sensor 11 detects the position of the head or upper body of the occupant in the seat 4. The amount of displacement in the forward direction or in the left-right direction of the vehicle width direction is determined on the basis of the seating position, in which the back of the occupant is in contact with the seat 4. The occupant position sensor 11 may include, for example, a plurality of proximity sensors arranged in the detection direction.

The G sensor 12 detects the accelerations applied to the automobile 1. The accelerations applied in the front-rear direction, left-right direction, and top-bottom direction may be detected.

The front airbag device 14 includes the front airbag 15, which deploys in front of the upper body of the occupant in the seat 4, and an inflator 16 that discharges gas into the front airbag 15.

The three-point seat belt device 17 includes the seat belt 18 having attachment points at both hips and the shoulder at the first side of the occupant in the seat 4, and an actuator (not illustrated) that retracts the seat belt 18.

The occupant protection controller 13 is coupled to the exterior imaging sensors 31, the automated driving controller 32, the G sensor 12, the occupant position sensor 11, the front airbag device 14, and the three-point seat belt device 17.

The occupant protection controller 13 controls the operation of the occupant protection device 10 in accordance with, for example, the driving state of the automobile 1. More specifically, the occupant protection controller 13 controls the operations of the front airbag device 14 and the three-point seat belt device 17.

Figure 4A:
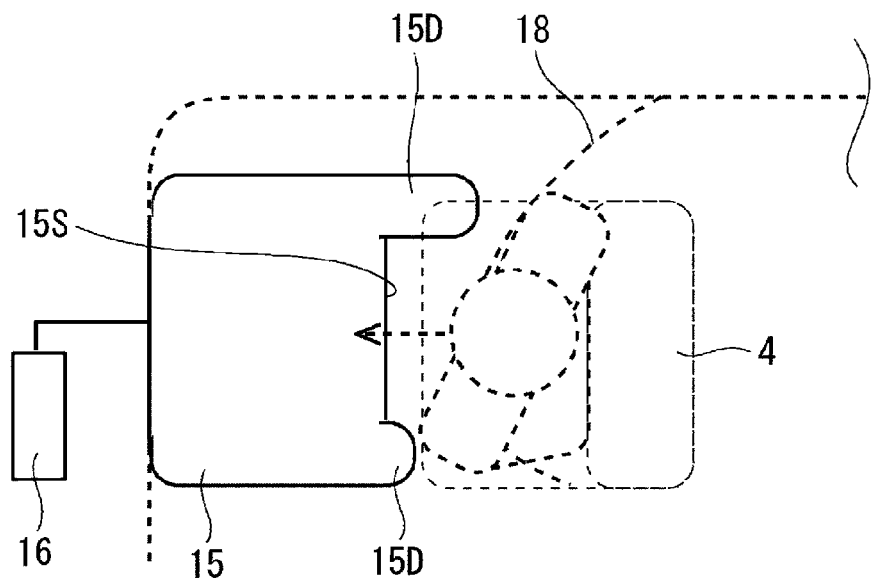
FIGS. 4A and 4B illustrate the operating states in which a front airbag included in a front airbag device illustrated in FIG. 3 deploys.
Figure 4B:
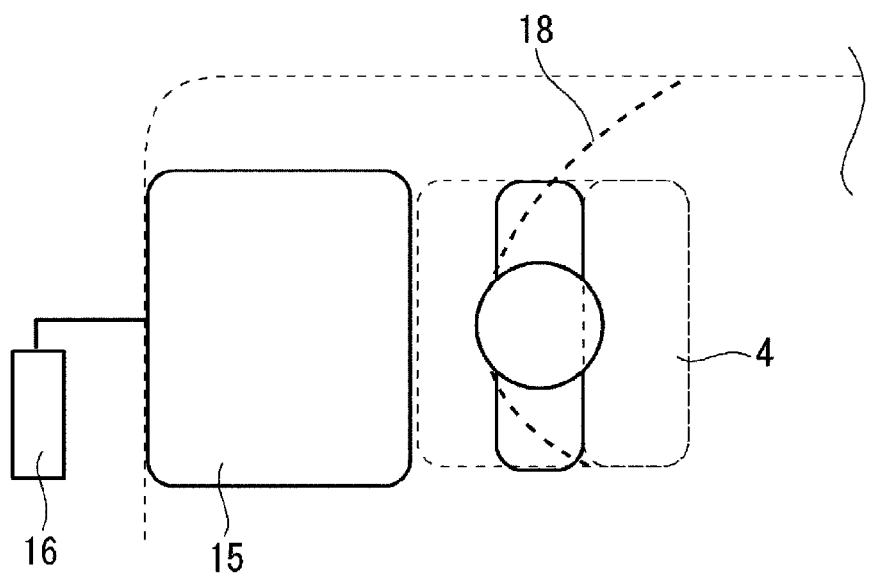

FIGS. 4A and 4B illustrate the operating states in which the front airbag 15 included in the front airbag device 14 illustrated in FIG. 3 deploys.

The occupant protection controller 13 determines the driving state of the automobile 1 when an occupant is in the automobile 1. The occupant protection controller 13 determines whether the automobile 1 is in an automated driving mode on the basis of, for example, an automated driving signal from the automated driving controller 32.

The occupant protection controller 13 determines whether there is an approaching object on the basis of images obtained by the exterior imaging sensors 31, and also determines the possibility of collision with the approaching object.

The occupant protection controller 13 also determines whether the automobile 1 is rapidly decelerating on the basis of the accelerations detected by the G sensor 12.

The occupant protection controller 13 also determines or estimates whether the occupant's upper body is largely displaced forward from the seating position on the basis of the detection value obtained by the occupant position sensor 11 or the information regarding the state of automated driving control obtained from the automated driving controller 32. The occupant protection controller 13 may evaluate the displacement based on whether it is beyond a normally expected range illustrated in FIG. 2A.

When there is a possibility of collision during automated driving control or during rapid deceleration, and when the upper body is largely displaced forward before collision, the occupant protection controller 13 causes the front airbag 15 to deploy as illustrated in FIG. 4A. In this case, the front airbag 15 includes a pair of shoulder-receiving projections 15D, which project rearward at both sides of the front airbag 15 in the vehicle width direction, in the deployed state. A contact surface 15S extends between the shoulder-receiving projections 15D in the vehicle width direction at a location in front of the shoulder-receiving projections 15D. The contact surface 15S is formed in the central region in the vehicle width direction so that the shoulder-receiving projections 15D at both sides in the vehicle width direction project rearward beyond therefrom.

In contrast, when none of the above applies and the upper body is in the seating position before collision, the occupant protection controller 13 causes the front airbag 15 to deploy into a substantially rectangular shape as illustrated in FIG. 4B. In this case, the front airbag 15 deploys in a large region so as not to form the shoulder-receiving projections 15D.

Figure 5A:
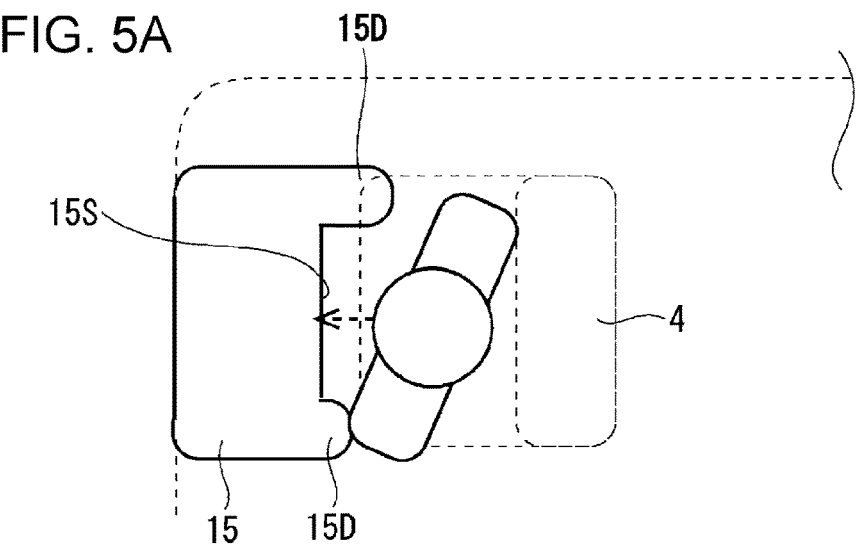
FIGS. 5A to 5C illustrate an example of the manner in which an occupant is protected when the front airbag deploys as illustrated in FIG. 4A.
Figure 5B:
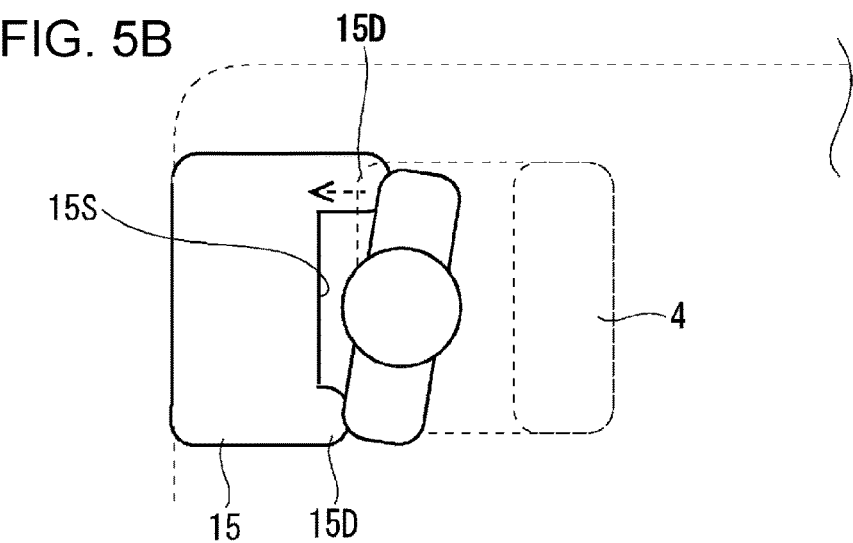
Figure 5C:
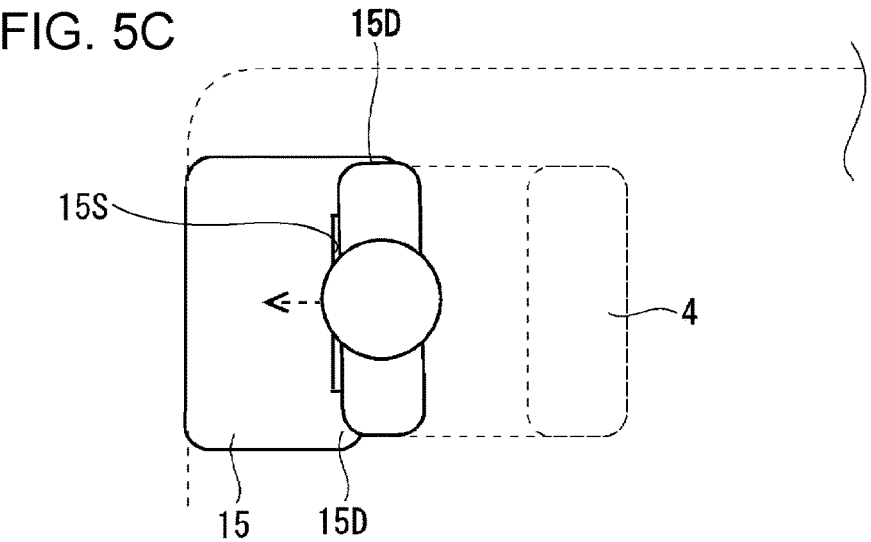

FIGS. 5A to 5C illustrate an example of the manner in which an occupant is protected when the front airbag 15 deploys as illustrated in FIG. 4A.

In this case, the upper body is restrained by the three-point seat belt 18 (not illustrated). Accordingly, as illustrated in FIG. 5A, the upper body is largely displaced forward from the seating position while being pivoted so that the shoulder at the second side, which is near the center in the vehicle width direction, is further forward than the shoulder at the first side before collision.

The front airbag 15 deploys in a small region such that the pair of shoulder-receiving projections 15D project rearward at both sides of the contact surface 15S in the vehicle width direction.

When the approaching object collides with the front of the vehicle body 2 in the front-rear direction, first, the shoulder at the second side of the upper body, which has been displaced forward from the seating position on the seat 4 before collision, comes into contact with the shoulder-receiving projection 15D near the center. The shoulder-receiving projection 15D near the center receives the shoulder at the second side of the upper body, which has been displaced forward from the seating position, so as to make it difficult for the shoulder to move further forward. Accordingly, the forward movement of the upper body is converted into a rotation of the upper body.

Then, as illustrated in FIG. 5B, the upper body rotates around the shoulder at the second side so that the shoulder of the upper body at the first side comes into contact with the shoulder-receiving projection 15D at the outer side in the vehicle width direction. The shoulder-receiving projection 15D at the outer side in the vehicle width direction buckles to absorb the kinetic energy of the upper body that rotates. Both shoulders of the upper body that have been displaced forward from the seating position before collision rotate and are received by the pair of shoulder-receiving projections 15D.

After that, as illustrated in FIG. 5C, the upper body substantially faces front, and the central portion of the upper body comes into contact with the contact surface 15S in the central region in the vehicle width direction. Thus, the upper body comes into contact with and is received by the entirety of the front airbag 15.

As described above, according to the present example, the front airbag 15 configured to deploy in front of the upper body of the occupant in the seat 4 is capable of deploying so as to receive the upper body that has been displaced forward from the seating position on the seat 4, and includes the pair of shoulder-receiving projections 15D capable of receiving both shoulders of the upper body that has been displaced forward from the seating position by projecting rearward at both sides of the front airbag 15 in the vehicle width direction in the deployed state. Therefore, even when the upper body of the occupant in the seat 4 has been displaced forward from the seating position on the seat 4 before collision during automated driving of the vehicle, both shoulders of the upper body may be received by the pair of shoulder-receiving projections 15D, and the occupant can be protected.

In the present example, one of the pair of shoulder-receiving projections 15D at the first side projects further toward the rear of the automobile 1 than the other one of the pair of shoulder-receiving projection 15D at the second side. Accordingly, after both shoulders of the occupant are received by the shoulder-receiving projections 15D at both sides, the shoulder-receiving projection 15D at the first side in the vehicle width direction may be caused to buckle first so that the upper body of the occupant is caused to rotate and impact absorption is facilitated by the rotation.

In the present example, the front airbag 15 in the deployed state includes the contact surface 15S that extends between the shoulder-receiving projections 15D in the vehicle width direction at a location in front of the rear ends of the shoulder-receiving projections 15D. Accordingly, even when the impact cannot be fully absorbed by the rotation caused by the pair of shoulder-receiving projections, the pair of shoulder-receiving projections 15D and the contact surface 15S provided therebetween subsequently receive the entirety of the upper body to absorb the impact.

In the present example, the front airbag 15 deploys so that the pair of shoulder-receiving projections 15D at both sides in the vehicle width direction project rearward beyond the central portion in the vehicle width direction. Therefore, both shoulders of the upper body of the occupant are received first, and then the entirety of the upper body is received.

In the present example, the controller configured to control the operation of the airbag device in accordance with the driving state of the vehicle causes the front airbag 15 to deploy so as to form the pair of shoulder-receiving projections 15D in a case of one or both of a collision during automated driving control including driving assistance control of the vehicle and a collision during rapid deceleration, and otherwise causes the front airbag 15 to deploy so as not to form the shoulder-receiving projections 15D and receive the entirety of the upper body that has been in the seating position before collision. Thus, irrespective of whether the upper body of the occupant has been in the seating position on the seat 4 or displaced forward from the seating position before collision, the front airbag 15 is capable of appropriately deploying depending on the situation.

In the present example, the position of the upper body of the occupant in the seat 4 is detected by a detector. Accordingly, the position of the upper body of the occupant before collision can be actually detected, and the front airbag 15 can appropriately deploy in accordance with the detected position.

Second Example

A vehicle occupant protection apparatus 10 according to a second example of the present invention will now be described. In the following description, components having structures that are the same as or similar to those in the first example are denoted by the same reference numerals, and differences from the first example will be mainly described.

Figure 6:
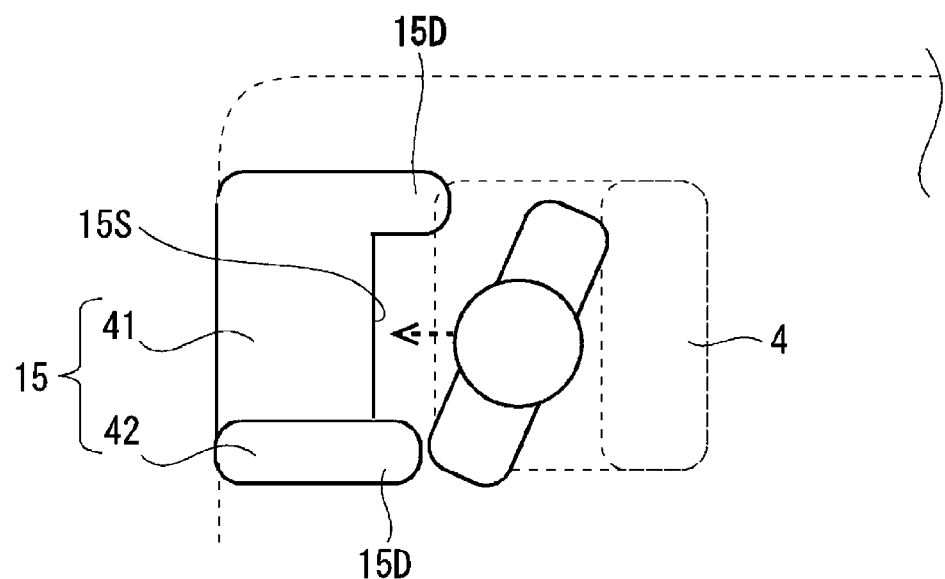
FIG. 6 illustrates a front airbag device according to a second example of the present invention.

FIG. 6 illustrates a front airbag device 14 according to the second example of the present invention.

The front airbag device 14 illustrated in FIG. 6 includes a front airbag 15 including a first bag body 41 and a second bag body 42.

The first bag body 41 deploys at the outer side in the vehicle width direction. The first bag body 41 includes a shoulder-receiving projection 15D that projects at the outer side of a contact surface 15S in the vehicle width direction. The contact surface 15S extends in the vehicle width direction.

The second bag body 42 is disposed next to the first bag body 41 at the side near the center in the vehicle width direction. The second bag body 42 projects rearward from the contact surface 15S of the first bag body 41 in the deployed state.

Thus, the front airbag 15 according to the present example includes two air chambers formed by the first bag body 41 and the second bag body 42.

The inflator 16 supplies gas to the first bag body 41 and the second bag body 42 in response to an activation signal from the occupant protection controller 13. When there is a possibility of collision during automated driving control or during rapid deceleration, and when the upper body is largely displaced forward before collision, the gas is supplied so that the inner pressure of the second bag body 42 is higher than the inner pressure of the first bag body 41.

Accordingly, the front airbag 15 deploys so that the shoulder-receiving projection of the second bag body 42 near the center in the vehicle width direction is harder than the first bag body 41 including the shoulder-receiving projection at the first side in the vehicle width direction. Thus, the shoulder at the second side of the upper body, which has been displaced forward from the seating position before collision, does not easily move further forward from the position at which the shoulder comes into contact with the corresponding shoulder-receiving projection.

When there is a possibility of collision in a driving state other than the above-described driving state, the inflator 16 may discharge the gas so that the second bag body 42 and the first bag body 41 have the same inner pressure. Accordingly, the entireties of second bag body 42 and the first bag body 41 deploy at a substantially uniform pressure in a manner similar to that illustrated in FIG. 4B.

As described above, in the present example, the three-point seat belt device 17 is capable of restraining the upper body of the occupant in the seat 4 in the seating position while holding the shoulder at the first side. Therefore, when, for example, the upper body of the occupant in the seat 4 is displaced forward from the seating position on the seat 4 before collision during automated driving of the vehicle, the upper body is not displaced such that the entirety thereof is displaced forward, but only a portion including the shoulder at the second side is largely displaced forward. Thus, only the portion of the upper body including the shoulder at the second side tends to be largely displaced forward.

As in the present example, the shoulder-receiving projection at the second side in the vehicle width direction may be formed as an air chamber in a bag body different from the bag body for the remaining portion. Accordingly, the shoulder-receiving projection at the second side in the vehicle width direction may be caused to deploy so as to be harder than the remaining portion, which includes the shoulder-receiving projection at the first side in the vehicle width direction, and receive the shoulder at the second side of the upper body, which has been displaced forward from the seating position before collision. Thus, the upper body is rotated around the shoulder at the second side, and the shoulder-receiving projection at the first side is caused to buckle so that the impact can be absorbed.

Third Example

A vehicle occupant protection apparatus 10 according to a third example of the present invention will now be described. In the following description, components having structures that are the same as or similar to those in the second example are denoted by the same reference numerals, and differences from the second example will be mainly described.

Figure 7:
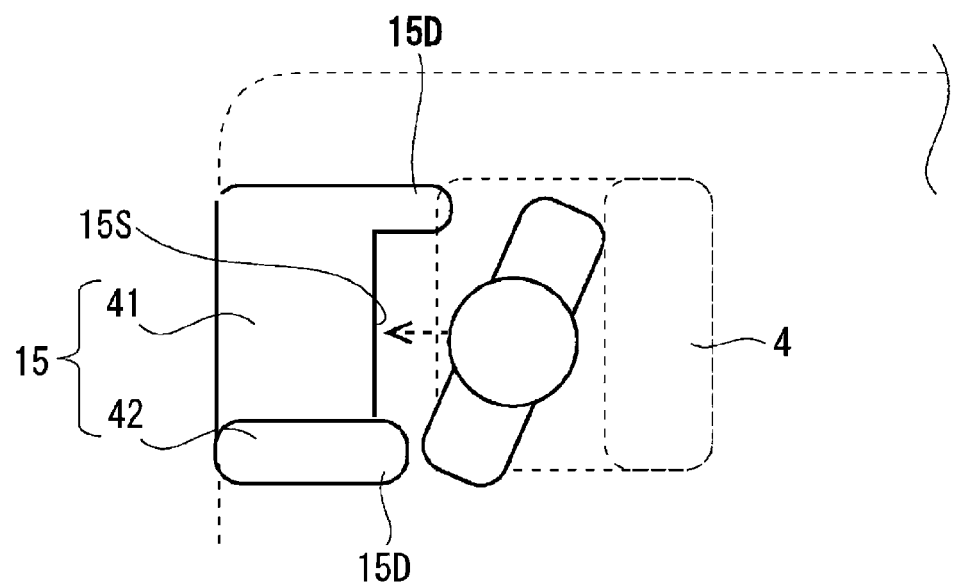
FIG. 7 illustrates a front airbag device according to a third example of the present invention.

FIG. 7 illustrates a front airbag device 14 according to the third example of the present invention.

Referring to FIG. 7, the shoulder-receiving projection 15D at the outer side in the vehicle width direction is thinner than the shoulder-receiving projection 15D near the center.

Therefore, the shoulder-receiving projection 15D at the outer side in the vehicle width direction more easily buckles than the shoulder-receiving projection 15D at the second side in the vehicle width direction upon receiving the load of the shoulder at the first side of the upper body, which has been displaced forward from the seating position on the seat 4 before collision.

Fourth Example

A vehicle occupant protection apparatus 10 according to a fourth example of the present invention will now be described. In the following description, components having structures that are the same as or similar to those in the second example are denoted by the same reference numerals, and differences from the second example will be mainly described.

Figure 8:
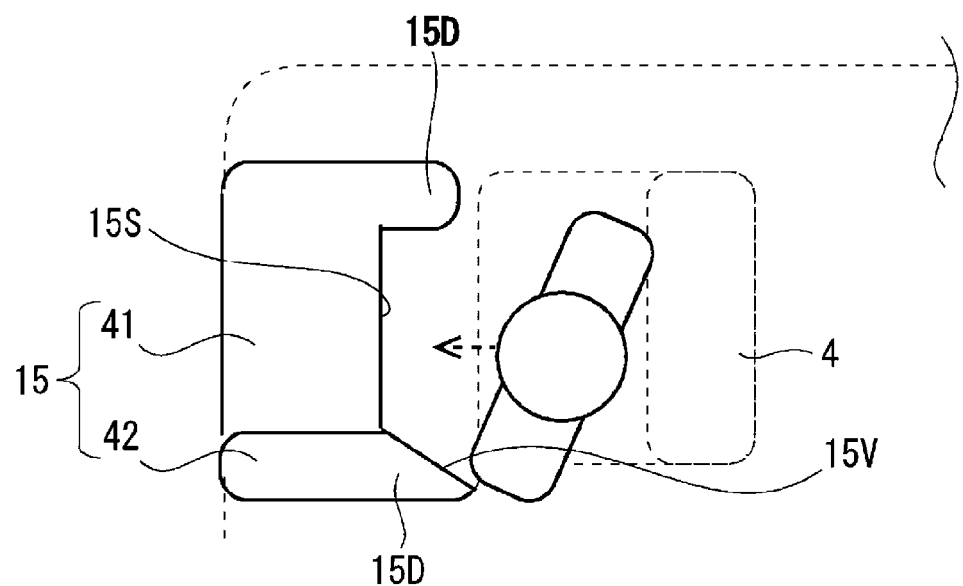
FIG. 8 illustrates a front airbag device according to a fourth example of the present invention.

FIG. 8 illustrates a front airbag device 14 according to the fourth example of the present invention.

Referring to FIG. 8, the shoulder-receiving projection 15D near the center in the vehicle width direction has an oblique surface 15V at the side facing the center of the front airbag 15. The rear end of the oblique surface 15V is closer to the center of the vehicle than the edge of the seat 4 near the center of the vehicle in the vehicle width direction.

In the present example, the shoulder-receiving projection 15D at the second side has the oblique surface 15V at the side facing the center of the front airbag 15. Therefore, the upper body of the occupant easily rotates on the oblique surface 15V of the shoulder-receiving projection 15D at the second side after coming into contact with the oblique surface 15V. Since the oblique surface 15V is provided, the shoulder can be received even when the contact position thereof is shifted.

Fifth Example

A vehicle occupant protection apparatus 10 according to a fifth example of the present invention will now be described. In the following description, components having structures that are the same as or similar to those in the fourth example are denoted by the same reference numerals, and differences from the fourth example will be mainly described.

Figure 9:
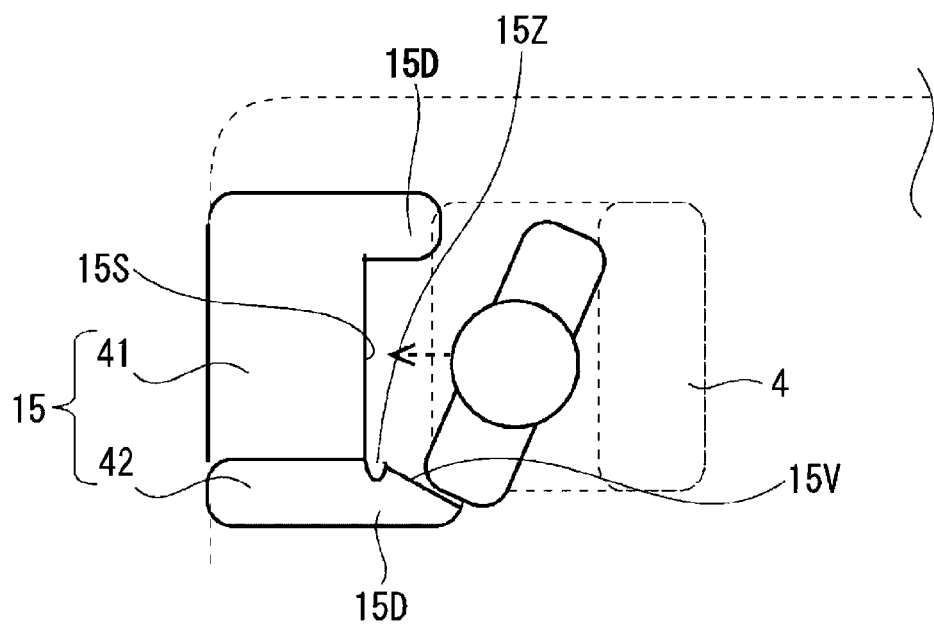
FIG. 9 illustrates a front airbag device according to a fifth example of the present invention.

FIG. 9 illustrates a front airbag device 14 according to the fifth example of the present invention.

Referring to FIG. 9, the shoulder-receiving projection 15D at the second side has a groove 15Z that extends in the vertical direction of the vehicle in the surface facing the center of the front airbag 15.

In the present example, the shoulder-receiving projection 15D at the second side has the groove 15Z that extends in the vertical direction of the vehicle in the surface facing the center of the front airbag 15. Accordingly, the shoulder-receiving projection 15D at the second side easily buckles so as to rotate toward the center of the front airbag 15 after receiving the load of the upper body of the occupant. Accordingly, the upper body of the occupant more easily rotates together with the shoulder-receiving projection 15D at the second side that rotates.

Although preferred examples of the present invention have been described, the present invention is not limited to the above-described examples, and various modifications and alterations are possible without departing from the scope of the invention.

The invention claimed is:

1. A vehicle occupant protection apparatus comprising:
a seat for an occupant of a vehicle;
a three-point seat belt device for restraining an upper body of the occupant in the seat;
an airbag device comprising a front airbag configured to deploy in front of the upper body of the occupant in the seat; and
an inflator configured to supply gas to the front airbag,
wherein by being supplied with gas, the front airbag is capable of deploying so as to receive the upper body that has been displaced forward from a seating position on the seat, and
wherein the front airbag comprises a pair of shoulder-receiving projections capable of receiving a first side shoulder of the upper body that is held by the three-point seat belt device and a second side shoulder of the upper body that is not held by the three-point seat belt device by projecting rearward at both sides of the front airbag in a vehicle width direction of the vehicle in a deployed state,
wherein the pair of shoulder-receiving projections comprises a first air chamber and a second air chamber different from the first air chamber,
wherein the inflator supplies gas to the first air chamber and the second air chamber,
wherein the first air chamber at a first side in the vehicle width direction for the first side shoulder projects further toward a rear of the vehicle than the second air chamber at a second side in the vehicle width direction for the second side shoulder, and
wherein, when a predetermined collision condition is satisfied, the inflator supplies gas to the first and second air chambers in such a manner that an inner pressure of the second air chamber is higher than an inner pressure of the first air chamber, so that one of the pair of shoulder-receiving projections for the second side shoulder expands so as to be harder than an other of the pair of shoulder-receiving projections for the first side shoulder.

2. The vehicle occupant protection apparatus according to claim 1, wherein the three-point seat belt device is configured to operate so as to restrain the upper body of the occupant in the seat in the seating position while holding the shoulder of the occupant at the first side in the vehicle width direction.

3. The vehicle occupant protection apparatus according to claim 2, wherein, when the front airbag deploys, the shoulder-receiving projection at the first side in the vehicle width direction more easily buckles than the shoulder-receiving projection at the second side in the vehicle width direction upon receiving a load of the shoulder at the first side of the upper body that has been displaced forward from the seating position on the seat.

4. The vehicle occupant protection apparatus according to claim 1, wherein the three-point seat belt device is configured to operate so as to restrain the upper body of the occupant in the seat in the seating position while holding the shoulder of the occupant at the first side in the vehicle width direction, and
wherein, when the front airbag deploys, the shoulder-receiving projection at the second side in the vehicle width direction deploys so as to be harder than other portions of the front airbag including the shoulder-receiving projection at the first side in the vehicle width direction, and receives the shoulder at the second side of the upper body that has been displaced forward from the seating position.

5. The vehicle occupant protection apparatus according to claim 3, wherein, when the front airbag deploys, the shoulder-receiving projection at the first side in the vehicle width direction more easily buckles than the shoulder-receiving projection at the second side in the vehicle width direction upon receiving a load of the shoulder at the first side of the upper body that has been displaced forward from the seating position on the seat.

6. The vehicle occupant protection apparatus according to claim 1, wherein the front airbag in a deployed state comprises a contact surface that extends between the pair of shoulder-receiving projections in the vehicle width direction at a location in front of rear ends of the shoulder-receiving projections.

7. The vehicle occupant protection apparatus according to claim 1, wherein the shoulder-receiving projection at a second side comprises an oblique surface at a side facing a center of the front airbag.

8. The vehicle occupant protection apparatus according to claim 1, wherein the shoulder-receiving projection at a second side has a groove that extends in a vertical direction of the vehicle in a surface facing a center of the front airbag.

9. The vehicle occupant protection apparatus according to claim 1, wherein the front airbag is capable of deploying so that the shoulder-receiving projections at both sides of the front airbag in the vehicle width direction project rearward beyond a central portion of the front airbag in the vehicle width direction.

10. The vehicle occupant protection apparatus according to claim 1, wherein the front airbag is capable of deploying so that the shoulder-receiving projections at both sides of the front airbag in the vehicle width direction project rearward beyond a central projection provided at a center of the front airbag in the vehicle width direction.

11. The vehicle occupant protection apparatus according to claim 1, further comprising:
a controller configured to control an operation of the airbag device in accordance with a driving state of the vehicle,
wherein the controller is configured to cause the front airbag to deploy so as to form the pair of shoulder-receiving projections when there is a possibility of one or both of a collision during automated driving control comprising driving assistance control of the vehicle and a collision during rapid deceleration, and otherwise causes the front airbag to deploy so as not to form the pair of shoulder-receiving projections and receive an entirety of the upper body that has been in the seating position.

12. The vehicle occupant protection apparatus according to claim 11, further comprising:
a detector configured to detect a position of the upper body of the occupant in the seat,
wherein the controller is configured to determine the position of the upper body during one or both of automated driving control comprising driving assistance control of the vehicle and rapid deceleration on the basis of a detection result obtained by the detector, and
wherein the controller is configured to cause the front airbag to deploy so as to form the pair of shoulder-receiving projections when the upper body has been displaced forward from the seating position, and causes the front airbag to deploy so as not to form the pair of shoulder-receiving projections when the upper body is in the seating position.

13. The vehicle occupant protection apparatus according to claim 1, wherein the first air chamber comprises a first bag body and the second air chamber comprises a second bag body which is deployed to be formed adjacent to the first bag body.

14. The vehicle occupant protection apparatus according to claim 13, wherein the first air chamber in a deployed state comprises a contact surface that extends between the first bag body and the second bag body.

15. The vehicle occupant protection apparatus according to claim 13, wherein the inflator supplies gas to the first bag body and the second bag body in such a manner that an inner pressure of the second bag body is greater than an inner pressure of the first bag body, and a hardness of the second bag body is greater than a hardness of the first bag body.

16. The vehicle occupant protection apparatus according to claim 13, wherein in a first driving state, the inflator supplies gas to the first and second bag bodies in such a manner that the inner pressure of the second bag body is greater than the inner pressure of the first bag body, and in a second driving state, the inflator supplies gas to the first and second bag bodies in such a manner that the inner pressure of the second bag body is the same as the inner pressure of the first bag body.

17. A vehicle occupant protection apparatus, comprising:
an airbag comprising:
a first bag body including a contact surface and a first projecting portion which projects from the contact surface by a first distance; and
a second bag body formed adjacent to the first bag body and including a second projecting portion which projects from the contact surface by a second distance less than the first distance, the contact surface of the first bag body extending from the first projecting portion to the second projecting portion; and
an inflator for supplying gas to the first and second bag bodies such that in a first driving state, an inner pressure of the second bag body is greater than an inner pressure of the first bag body and a hardness of the second bag body is greater than a hardness of the first bag body.

18. The vehicle occupant protection apparatus according to claim 17, wherein
the inflator supplies gas to the first and second bag bodies such that, in a second driving state, the inner pressure of the second bag body is the same as the inner pressure of the first bag body.

* * * * *